US012678742B2

(12) United States Patent
Chen et al.

(10) Patent No.: US 12,678,742 B2
(45) Date of Patent: Jul. 14, 2026

(54) ALL-CARBON FILM BASED ON ACTIVATED CARBON AND PREPARATION METHOD AND USE THEREOF

(71) Applicant: Zhejiang University, Hangzhou (CN)

(72) Inventors: Baoliang Chen, Hangzhou (CN); Kaijie Yang, Hangzhou (CN); Xiaoying Zhu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 402 days.

(21) Appl. No.: 16/328,205

(22) PCT Filed: Aug. 25, 2017

(86) PCT No.: PCT/CN2017/098964
§ 371 (c)(1),
(2) Date: Feb. 25, 2019

(87) PCT Pub. No.: WO2018/036553
PCT Pub. Date: Mar. 1, 2018

(65) Prior Publication Data
US 2019/0176096 A1 Jun. 13, 2019

(30) Foreign Application Priority Data
Aug. 25, 2016 (CN) .......................... 201610734288.4

(51) Int. Cl.
*B01D 71/02* (2006.01)
*B01D 53/34* (2006.01)
(Continued)

(52) U.S. Cl.
CPC .......... *B01D 71/0211* (2022.08); *B01D 53/34* (2013.01); *B01D 67/0044* (2013.01);
(Continued)

(58) Field of Classification Search
None
See application file for complete search history.

(56) References Cited

U.S. PATENT DOCUMENTS 8,703,090 B2 * 4/2014 Tour ........................ C01B 32/23
423/447.1
2006/0000352 A1 * 1/2006 Tower .................... B01D 53/02
95/8
(Continued)

FOREIGN PATENT DOCUMENTS

CN 104192836 A 12/2014
CN 105448540 A * 3/2016
(Continued)

OTHER PUBLICATIONS

Xu, G., Zheng, C., Zhang, Q. et al. Binder-free activated carbon/carbon nanotube paper electrodes for use in supercapacitors. Nano Res. 4, 870-881 (2011). (Year: 2011).*
(Continued)

*Primary Examiner* — Jason M Greene
*Assistant Examiner* — Eric J McCullough

(57) ABSTRACT
The present disclosure provides an activated carbon-based all-carbon membrane (ACM), which is formed by using activated carbon as a base material and graphene as a crosslinking agent for connection, and can stably exist independent of a substrate. The membrane surface pore structure can be adjusted by the addition proportion of graphene, and the membrane surface pore size can be adjusted from micron-scale to nano-scale. The preparation method of ACM comprises uniformly mixing and then filtering an activated carbon dispersion and a graphene dispersion, then the graphene and the activated carbon are assembled on the membrane filter substrate. The membrane
(Continued)

can be used in the fields such as water and air purification, chemical catalysis, and energy reservation.

14 Claims, 16 Drawing Sheets

(51) Int. Cl.

| | |
|---|---|
| *B01D 67/00* | (2006.01) |
| *C02F 1/28* | (2023.01) |
| *C02F 1/44* | (2023.01) |
| *C02F 101/20* | (2006.01) |

(52) U.S. Cl.

CPC ............ *B01D 67/0046* (2013.01); *C02F 1/44* (2013.01); *C02F 1/442* (2013.01); *C02F 1/444* (2013.01); *B01D 2323/30* (2013.01); *C02F 1/283* (2013.01); *C02F 2101/20* (2013.01); *C02F 2303/04* (2013.01)

(56) References Cited

U.S. PATENT DOCUMENTS

| | | | | |
|---|---|---|---|---|
| 2010/0098877 A1* | 4/2010 | Cooper | ................ | B01D 53/228 427/551 |
| 2014/0154841 A1 | 6/2014 | Chu et al. | | |
| 2014/0154941 A1* | 6/2014 | Zhamu | .................... | H01B 1/04 442/136 |
| 2014/0299818 A1* | 10/2014 | Do | ......................... | H01G 11/36 252/502 |
| 2015/0129502 A1* | 5/2015 | Meng | .................... | C02F 1/283 210/660 |

FOREIGN PATENT DOCUMENTS

| | | | | |
|---|---|---|---|---|
| CN | 105709498 A | | 6/2016 | |
| CN | 104192836 B | * | 8/2016 | |
| CN | 106345319 A | | 1/2017 | |
| WO | WO-2013170249 A1 | * | 11/2013 | ............. B01D 69/10 |

OTHER PUBLICATIONS

Xianfu Chen et al., A reduced graphene oxide nanofiltration membrane intercalated by well-dispersed carbon nanotubes for drinking water purification, Nanoscale, 2016,8, 5696-5705 (Year: 2016).*

He, D., et al. (2014), An efficient and eco-friendly solution-chemical route for preparation of ultrastable reduced graphene oxide suspensions. AIChE J., (Year: 2014).*

Qiang Dong, et al., Electrospun Composites Made of Reduced Graphene Oxide and Activated Carbon Nanofibers for Capacitive Deionization, Electrochimica Acta, vol. 137, 2014, pp. 388-394 (Year: 2014).*

M. R. M. Jasni, M. Deraman, M. Suleman, E. Hamdan, N. E. S. Sazali, N. S. M. Nor, S. A. Shamsudin; Effect of nano-scale characteristics of graphene on electrochemical performance of activated carbon supercapacitor electrodes. AIP Conf. Proc. Feb. 8, 2016; 1710 (1): 030034 (Year: 2016).*

Haibo Li , et al., Reduced graphene oxide and activated carbon composites for capacitive deionization, J. Mater. Chem., 2012, 22, 15556-15561 (Year: 2012).*

* cited by examiner

ALL-CARBON FILM BASED ON ACTIVATED CARBON AND PREPARATION METHOD AND USE THEREOF

CROSS REFERENCE TO RELATED APPLICATION

This application is a national stage application of International application number PCT/CN2017/098964, filed Aug. 25, 2017, which claims the priority benefit of Chinese Patent Application No. 201610734288.4, filed on Aug. 25, 2016, which is hereby incorporated by reference in its entirety.

TECHNICAL FIELD

The invention belongs to the field of materials, especially related with an activated carbon-based all-carbon membrane (ACM), its preparation method and use.

BACKGROUND

Activated carbon (AC) is a typical porous carbon material which has been widely applied in water or air purification, chemical catalysis, medicine separation and energy reservation. In the field of environmental pollution control and chemical separation, activated carbon is widely used as a highly efficient adsorption material. In practical applications, most of the process of applying activated carbon is directly added by the granular state, and its drawbacks will inevitably involve solid-liquid separation process after the treatment, the recycling process, and the loss of granular activated carbon. (Stoquart, C. et al. Hybrid membrane processes using AC treatment for drinking water: A review. Journal of Membrane Science 411, 1-12 (2012). Nethaji, S. et al. Preparation and characterization of corn cob activated carbon coated with nano-sized magnetite particles for the removal of Cr(VI). Bioresource Technology 134, 94-100 (2013)). As a highly efficient adsorption material, activated carbon has good adsorption and removal properties for heavy metal ions and organic pollutants. The adsorption refers to a mass transfer process, which refers to a process in which a material collects and fixes molecules and ions in a surrounding (gas or liquid environment) to its surface by force.

As a granular adsorption material, activated carbon has no interception capacity and can't remove particle pollutants such as microorganism and nano particles. The interception capacity means a physical sieving effect that intercepts larger sized particles through steric hindrance while permitting smaller sized particles to pass. In short, membrane possessing specific pore structures can intercept materials larger than its pore size while let smaller materials pass. For AC particles, the pore between activated carbon particles can't intercept nano particle by filtration, even though filling AC particles into a container to form a device. If AC particles don't form fixed shape (such as membrane), the physical form of AC particles determines that they have no interception capacity.

Activated carbon (AC) is always directly applied in contaminated water as particle adsorbents. However, this direct application will inevitably causes the loss of activated carbon, and involves a later time-cost solid-liquid separation process. There are also applications in which activated carbon particles is filled in a container or embedded in a polymer. But AC filled container is easily contaminated and clogged during use, and the embedded polymer will block the pores of AC and shield the surface structure of AC, affecting its adsorption performance. Also the filled container or the polymer of embedded activated carbon often cannot resist corrosive chemicals or high operate temperature, which limits its application field. Therefore, research and development of the fixed-form activated carbon device is of great significance for the application of activated carbon.

Membrane separation is a technology for separating solid from liquid that has been widely applied in water purification (Bolisetty, S. et al. Amyloid-carbon hybrid membranes for universal water purification water purification. Nature Nanotechnology 11, 365-372 (2016). Shannon, M. A. et al. Science and technology for water purification in the coming decades purification in the coming decades. Nature 452, 301-310 (2008).). Membrane is a physical barrier which allows small partials to pass through and intercepts large ones. The pore size of the membrane can be regulated. Even ions can be intercepted when using reverse osmosis membrane. However, for a membrane, the pore size is in contradiction with the water flux. The membrane with smaller pore size can intercept smaller particles and requires higher operating pressure and more energy (ElMekawy, A. et al. The near-future integration of microbial desalination cells with reverse osmosis technology. Energy Environ. Sci. 7, 3921-3933 (2014).)

In the membrane preparation process, interception and flux are two contradictions that are difficult to reconcile. For example, the existing graphene-based membrane possess nanometer-scale channels which can intercept small molecules or ions in water but also restrict the permeation of water. This type of membrane has a very low water flux, limiting its efficiency (Mi, B. X. et al. Enabling Graphene Oxide Nanosheets as Water Separation Membranes. Environ. Sci. Technol., 47, 3715-3723 (2013)). The prior art has not been able to produce a high-performance membrane that can remove small molecular pollutants while having a high water flux.

In order to form activated carbon membrane for water treatment, the existing technology is to blend granular activated carbon with a polymer. (Yoshikawa, M. et al. Specialty polymeric membranes: 12. Pervaporation of benzene-cyclohexane mixtures through carbon graphite-nylon 6 composite membranes. Journal of Membrane Science 177, 49-53 (2000). Bolisetty, S. et al. Amyloid-carbon hybrid membranes for universal water purification water purification. Nature Nanotechnology 11, 365-372 (2016)). But the disadvantages of using polymer as cross-linker are as follows: First, polymer will shield the surface of the activated carbon, so that the adsorption capacity is weakened. Second, most of the polymer is dissolved in a specific organic solvent, and this chemical instability greatly limits its application in organic solvent environments. Third, some polymer membranes are often sensitive to strong acids, strong alkalis, high temperature environments, etc. These drawbacks limit their use in harsh environments. Fourth, up to now, water purification is a complex process, including flocculation, aeration, adsorption, and membrane separation to remove small molecular pollutants and nano-scale particles. A novel type of activated carbon membrane is urgently needed, which can intercept particulate pollutants (such as bacteria and nanoparticles) in one step, and simultaneously adsorb and remove soluble small molecule pollutants (such as dyes, organic pollutants, etc.), and have high water flux.

All-carbon membrane is a type of membrane made entirely of carbon material. Due to its excellent structural stability and special properties, all-carbon membrane has superior chemical stability which can stalely exist in strong acids, strong alkalis or corrosive organic solvents. Currently there are two types of all-carbon membrane, that is pure graphene-based membrane and pure carbon nanotube membrane. But due to their high cost, complex preparation process, hard pore regulation and weak adsorption capacity, those two types of all-carbon membranes are hard to apply in practical wastewater treatment. In addition, due to their specific physical structure there is almost no interaction capacity among activated carbon particles. Thus, activated carbon particles cannot be independently formed into membrane (FIG. 6a). To our knowledge, there is no activated carbon-based all-carbon membrane.

SUMMARY

The purpose of this disclosure is to solve the problems existing in the prior art and to provide an activated carbon-based all-carbon membrane (ACM), its preparation method and use thereof. This type of membrane possesses high adsorption capacity, good interception capacity and high water-flux at the same time. It provides a wide range of applications for activated carbon.

Due to its large specific surface area and rich porous structure, activated carbon has superior adsorption capacity for dissolved pollutants in water and shows great application potential in different fields. However, due to the large size of the activated carbon particles and the limitation of their irregular surface, activated carbon particles are difficult to interact with each other and to form a device. In order to solve the problem that the interaction of the activated carbon particles is weak and the device is difficult to be formed, without introducing high molecular polymer, this disclosure adopts a brand new idea: using the π-electron structure on the surface of the activated carbon and graphene with an aromatic surface as a carbonaceous crosslinking agent, the granular activated carbon is formed into a membrane by the π-π interaction force between the activated carbon and the carbonaceous crosslinking agent surface. This type of membrane has good interception capacity while maintaining its adsorption capacity. This type of all-carbon membrane has a controllable pore structure and has superior adsorption properties for pollutants. Its pore size can be regulated from micro-scale to nano-scale under the control of the amount of crosslinker added.

The specific technical scheme of the disclosure is as follows:

An activated carbon-based all-carbon membrane (ACM), comprising: activated carbon as basic material, graphene as crosslinking agent, wherein under the crosslinking action of the graphene, the activated carbon of the basic material are connected to each other, and the thickness of ACM is regulated by addition amount of the activated carbon, and surface pore structure of ACM is regulated by addition ratio of graphene.

In some implementations, the mass ratio of the graphene to the activated carbon is 1%~10% and the preferred ratio is 1%~7%.

In some implementations, the activated carbon is granular and forms the all-carbon membrane without supporting structure, through π-π interaction force between the activated carbon and the graphene.

In some implementations, the structure of the membrane is configured to be regulated orderly. It means the regulation can be performed continuously.

In some implementations, the membrane's surface structure becomes denser and surface pore size of the membrane becomes smaller with the increase of graphene ratio.

In some implementations, the surface pore size of the membrane can be regulated from micro-scale to nano-scale by controlling the ratio of graphene addition, and selective separation of different size pollutants can be realized.

In some implementations, the thickness of the membrane can be regulated by the addition amount of activated carbon, and the more the activated carbon is added, the thicker the membrane becomes and the larger adsorption capacity the membrane has.

In some implementations, the size of activated carbon is micro-scale.

In some implementations, the surface pore size of membrane is 24 nm~2 μm.

In some implementations, the thickness of membrane is 25~100 μm.

In some implementations, the graphene is reduced graphene oxide.

The other purpose of this disclosure is to provide a method for preparing the activated carbon-based all-carbon membrane (ACM), comprising the following steps:

dispersing activated carbon in water to form an activated carbon dispersion;

adding a graphene dispersion into the activated carbon dispersion to form a mixed solution; and filtrating the mixed solution wherein graphene from the graphene dispersion and the activated carbon from the activated carbon dispersion are assembled on membrane filter substrate to form the activated carbon-based all-carbon membrane.

The membrane is made of activated carbon as a basic material, and graphene is connected as a crosslinking agent to form an activated carbon-based all-carbon membrane (ACM). Under the crosslinking action of graphene, activated carbon particles are connected to each other, and the activated carbon is completely connected. The thickness of ACM is regulated by the addition amount of the activated carbon, and the surface pore structure of ACM is regulated by the addition ratio of graphene.

In some implementations, the prepared membrane can be peeled off from the membrane filter substrate to be a freestanding membrane after drying.

In some implementations, activated carbon is better to micro-scale, as smaller size is easier to be dispersed in water.

In some implementations, during activated carbon dispersion process, the pH is adjusted to alkaline and preferred pH >10. So the activated carbon has a strong electrostatic repulsion in water, and the electrostatic repulsion is >−30 mV, further enhancing its dispersing ability.

In some implementations, the graphene dispersion is obtained by a partial reduction of graphene oxide dispersion. It is an innovation of the present disclosure to utilize the non-covalent π-π interaction force between the crosslinking agent and the activated carbon to make the granular activated carbon to form a device. The surface of the carbonaceous crosslinking agent is reduced as much as possible under the premise of ensuring sufficient dispersion of the carbonaceous crosslinking agent in water. Oxygen-containing functional groups can enhance its hydrophobic interaction and surface π-electron system, which is beneficial to membrane stability.

In some implementations, graphene oxide is reduced by chemical reduction. During chemical reduction process, the concentration of graphene oxide is controlled in the range of 0.05~0.1 mg/mL and pH of the dispersion is controlled in the range of 9~12. And the graphene oxide dispersion is then heated to be reduced.

In some implementations, the ID/IG of Raman spectra for the said graphene dispersion is equal to or smaller than 0.91. When the pH of the graphene dispersion is controlled in the range of 9~12, a strong electrostatic repulsion between the carbonaceous crosslinking agents is ensured, so that it is sufficiently dispersed in water to prevent agglomeration thereof, and the pH is preferably 11. At the same time, the concentration is controlled in the range of 0.05~0.1 mg/mL to prevent agglomeration caused by higher concentration.

In some implementations, the granular activated carbon is fully dispersed in water under the action of ultrasound to obtain the activated carbon dispersion.

In some implementations, the mixed solution is placed in a pressure filter, and activated carbon-based all-carbon membrane (ACM) is formed on a microporous membrane substrate by pressure filtration. The driving force in the pressure filter may be nitrogen gas or other gas, and the pressure is controlled in the range of 0.05~0.6 Mpa, so that the mixed solution filtration assembly process can be completed within a short period of time. The filtration is finished within 30 minutes, preventing the long precipitation of the activated carbon dispersion that could have resulted in uneven membrane formation. The bottom of the pressure filter needs to be assembled by microporous membrane as the substrate. There is no requirement for material of microporous membrane substrate, which is used for assembly of activated carbon and carbonaceous crosslinking agent. Smooth surface and small activated carbon force can facilitate peeling off from the surface of the substrate after membrane formation.

In some implementations, the mass ratio of graphene to activated carbon can be regulated in the mixed solution, which is preferred to be in the range of 1%~10%. The thickness of ACM can be regulated by the addition amount of activated carbon and the surface pore structure of ACM can be regulated by the ratio of the carbonaceous crosslinking agent graphene ratio and the thickness of ACM is regulated by activated carbon amount.

In some implementations, the structure of the membrane is configured to be regulated orderly. It means the regulation can be performed continuously.

In some implementations, in ACM, the mass ratio of the graphene to the activated carbon is 1%~10% and the preferred ratio is 1%~7%.

In some implementations, the activated carbon is granular and forms the all-carbon membrane without supporting structure, through π-π interaction force between the activated carbon and the graphene.

In some implementations, the membrane's surface structure can be denser and surface pore structure can be smaller with the increase of graphene ratio.

In some implementations, the surface pore size of membrane can be regulated from micro-scale to nano-scale by controlling the ratio of graphene addition.

In some implementations, the thickness of membrane can be regulated by the addition amount of activated carbon, and the more the activated carbon is added, the thicker the membrane is and the larger adsorption capacity the membrane has.

In some implementations, the size of activated carbon is micro-scale.

In some implementations, the surface pore size of membrane is 24 nm~2 μm.

In some implementations, the thickness of membrane is 25~100 μm.

In some implementations, the said graphene is reduced from graphene oxide.

This disclosure also provides a novel method to prepare a specific activated carbon device. The activated carbon-based all-carbon membrane (ACM) can be produced without polymer and can exist freestandingly without other supporting structure. The membrane has superior pore structure and specific surface area. This all-carbon membrane has the following advantages: compared with the polymeric membrane, activated carbon-based all-carbon membrane (ACM) has superior chemical stability and thermal stability. Compared with pure graphene-based membrane and pure carbon nanotube membrane, ACM has a good price advantage due to low production cost. At the same time, the control of the surface pore size of the membrane can be efficiently regulated by the control of the addition amount of the carbonaceous crosslinking agent, and the particulate contaminants of different sizes can be selectively retained. The activated carbon-based all-carbon membrane (ACM) can effectively intercept microorganisms and nanoparticles in water, and can effectively remove dissolved pollutants such as dyes, polycyclic aromatic hydrocarbons and heavy metal ions in polluted water.

This disclosure provides the use of the activated carbon-based all-carbon membrane in any of the above described forms for water purification, air purification, chemical catalysis, or energy storage.

This disclosure provides the use of the activated carbon-based all-carbon membrane prepared by any of the methods described above for water purification, air purification, chemical catalysis, or energy storage applications.

Due to its superior chemical stability, adsorption capacity and controlled pore structure, ACM has great application potential in the fields of water purification, air purification, chemical catalysis, or energy storage.

This disclosure also provides a water purification device comprising the activated carbon-based all-carbon membrane in any of the above described forms.

This disclosure also provides a water purification device comprising the activated carbon-based all-carbon membrane prepared by any one of the methods described above.

ACM disclosed in this invention has the following advantages:

1. This invention utilizes reduced graphene oxide as crosslinking agent and prepares a freestanding ACM for the first time in an environmentally friendly way.

2. Compared with the traditional activated carbon particles, ACM maintains the superior adsorption capacity of the activated carbon itself, and also has selective interception capacity at the same time. ACM can intercept particles larger than 200 nm with 100% intercepting ratio and avoids the recovery process of adsorbent materials during application.

3. By the strong π-π interaction force between activated carbon and reduced graphene oxide, ACM has superior chemical stability compared with activated carbon membrane formed by general polymer bonding. ACM can stably exist in strong acid, strong alkali and corrosive organic solvent environment. ACM has high thermal stability and can be applied under high temperature conditions.

4. Compared to graphene-based and carbon nanofiber-based membranes, ACM has the advantages of low cost and easy regulation of surface pore size.

5. ACM has excellent adsorption capacity and interception capacity, and can be easily applied to water purification and organic solvent purification by a single filtration step to remove various pollutants in water and organic solvents.

BRIEF DESCRIPTION OF THE DRAWINGS

FIG. 6a is the pure activated carbon that fails to form a membrane, FIG. 6b is ACM that is formed through the agency of graphene as crosslinking agent.

FIG. 8A-E refer to the membranes with 0%, 1%, 3%, 5%, 7% graphene ratio respectively.

FIG. 9A-E refer to the membranes with 0%, 1%, 3%, 5%, 7% graphene ratio respectively.

FIG. 16A is the adsorption breakthrough curve of Ag+ solution through ACM_20-1. FIG. 16C is adsorption breakthrough curve of PHE solution through ACM_20-1. FIG. 16D is separation performance of ACM_5-7 to nanosilver and Ag+ mixed dispersion. FIG. 16E-F are Ultraviolet-visible spectra of mixed pollutants and concentration variation of Ag+ and PHE in water before and after one-step filtration. FIG. 16G-H are Ultraviolet-visible spectra of mixed pollutants and concentration variation of Ag+ and PHE in acetone before and after one-step filtration. FIG. 16I is the recycle experiment of *E. coli* filtration through ACM.

FIG. 17A is the color change of graphene oxide before and after reduction.

FIG. 19A1-A3 are photo images of pure activated carbon, SEM images of surface morphology under low magnification, SEM images of surface morphology under high magnification respectively. FIG. 19B1-B3 are photo images of ACM_20-1 with reduced graphene oxide at a ratio of 1%, SEM images of surface morphology under low magnification, SEM images of surface morphology under high magnification respectively. FIG. 19C1-C3 are photo images of ACM_20-3 with reduced graphene oxide at a ratio of 3%, SEM images of surface morphology under low magnification, SEM images of surface morphology under high magnification respectively. FIG. 19E1-E3 are photo images of ACM_20-7 with reduced graphene oxide at a ratio of 7%, SEM images of surface morphology under low magnification, SEM images of surface morphology under high magnification respectively. FIG. 19A4 is the SEM image of membrane cross-section to reveal membrane's thickness. FIG. 19B4, FIG. 19C4, FIG. 19D4, FIG. 19E4 are the cross-section morphologies of ACM with reduced graphene oxide at a ratio of 1%, 3%, 5% and 7% respectively.

DETAILED DESCRIPTION OF THE PREFERRED EMBODIMENTS

Figure 1:
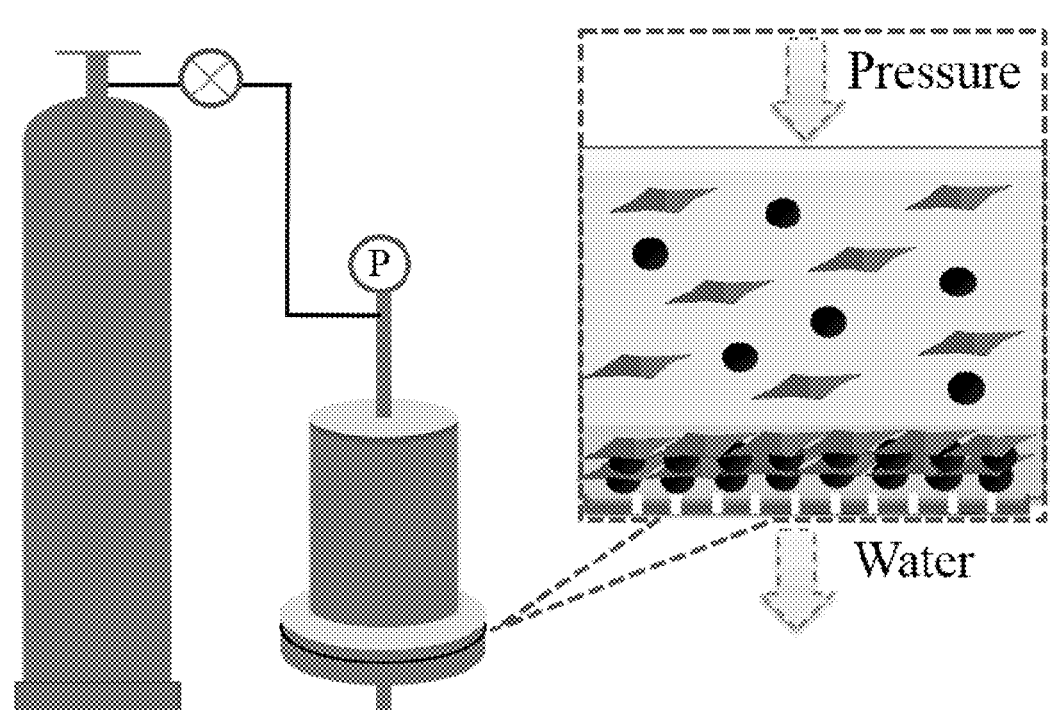
FIG. 1 is the schematic illustration of ACM preparation process.

The following implementation is only used to illustrate the present disclosure while isn't used to restrict the range of the present disclosure. Besides it should be understood that after reading the content which the present disclosure has proposed, this field's technicians can make various changes or modifications to the present disclosure. These equivalent forms are also included in the range that the present application's attached claims have restricted. The reagents or materials in the disclosure are all commercially available products unless otherwise specified.

Preparation of Graphene Dispersion

The graphene dispersion is prepared by partial reduction of the graphene oxide dispersion. Specifically, the graphene oxide is configured as an aqueous solution, the graphene in the solution is controlled at 0.05-0.1 mg/mL, and the pH is controlled at 9-12 to achieve electrostatic regulation, so that the graphene can be sufficiently dispersed in water. The solution was heated and reduced at 90° C. for 15 minutes to obtain a graphene oxide dispersion.

Embodiments 1-7

The membrane was prepared through filtration assembly. The mixed dispersion of graphene and activated carbon (AC) was fully dispersed by mutual electrostatic interaction. AC and graphene were mixed well in a certain ratio and the dispersion was added into filter. Under the driving force, AC and graphene can be well assembled on microporous membrane substrate. The method for preparing the activated carbon-based all-carbon membrane (ACM) is as follows:

(1) The activated carbon was first grinded and passed through a 500 mesh to ensure its size is in the micron range.

(2) The micron-sized activated carbon was added to water, and the pH of the dispersion was adjusted to 11. Under the mutual electrostatic regulation, granular activated carbon can be fully dispersed in water with the assistance of ultrasonication and the activated carbon dispersion is obtained. It is worth to note that pH can affect (1 μm) with almost 100% intercept rate when the mass ratio of graphene to activated carbon reaches 2%. ACM can intercept nano silica (200 nm) with almost 100% intercept rate when the mass ratio of graphene to activated carbon reaches 3%. And ACM can intercept nanosilver (50 nm) with almost 99.23% intercept rate when the mass ratio of graphene to activated carbon reaches 7%. Results indicate that the surface pore structure of ACM can be regulated continuously by graphene ratio. Higher graphene ratio will result in smaller surface pore size. ACM can be applied in microorganism and nano particle interception. In addition, it can also be used to remove dissolved pollutants such as dyes, polycyclic aromatic hydrocarbons, heavy metal ions, etc. in polluted water.

TABLE 1

The interception performance of membranes with different graphene ratio

| Pollutants | Size | Embodiment 1 | Embodiment 2 | Embodiment 3 | Embodiment 4 | Embodiment 5 | Embodiment 6 | Embodiment 7 |
|---|---|---|---|---|---|---|---|---|
| Chlorella | 2 μm | 100.00% | 100.00% | 100.00% | 100.00% | 100.00% | 100.00% | 100.00% |
| E. coli | 1 μm | 98.88% | 100.00% | 100.00% | 100.00% | 100.00% | 100.00% | 100.00% |
| Nano Silica | 200 nm | 59.09% | 95.60% | 100.00% | 100.00% | 100.00% | 100.00% | 100.00% |
| Nano Ag | 50 nm | 13.30% | 28.60% | 36.93% | 50.88% | 60.44% | 82.14% | 99.23% | the electrostatic regulation effect. When the pH of dispersion is larger than 10, the surface potential of AC will be <−30 mV. After 2 min ultrasonication, AC can be well dispersed. As long as the pH remains alkaline, the dispersion effect can be basically achieved.

(3) The prepared graphene dispersion and the activated carbon dispersion are thoroughly mixed under the conditions of vibration and ultrasonication. The mass ratio of graphene and activated carbon in the mixed dispersion was adjusted to 1%, 2%, 3%, 4%, 5%, 6% and 7% and were designated as Embodiment 1 to Embodiment 7, respectively.

(4) The mixed mixture of activated carbon and carbonaceous crosslinking agent in each embodiment is placed in a pressure filter in sequence, with nitrogen as a pressurized gas, a pressure range of 0.05~0.6 Mpa, and a pore diameter of the microporous membrane substrate of 0.22, the mixture quickly forms a membrane within 30 minutes.

(5) After drying, ACM can be peeled off from the substrate.

The membranes prepared according to Embodiment 1, 3, 5, 7 were investigated by SEM and the SEM images are FIG. 1-FIG. 5. It can be seen that under the cross-linking action of graphene, activated carbon (AC) particles as a basic material are connected to each other to form an integral body. And with the increase of graphene ratio, the surface structure of ACM becomes denser and the surface pore size becomes smaller. At the same time the thickness of ACM can be regulated by added AC amount. More added AC amount result in thicker membrane which possesses stronger adsorption capacity.

The membranes prepared according to Embodiment 1 to 7 are subjected to interception performance test using *chlorella*, *E. coli*, nano silica and nanosilver. As shown in Table 1, membranes with different graphene ratio possess different pore structure. ACM can intercept *chlorella* (2 μm) with almost 100% intercept rate when the mass ratio of graphene to activated carbon reaches 1%. ACM can intercept *E. coli*

Figure 6:
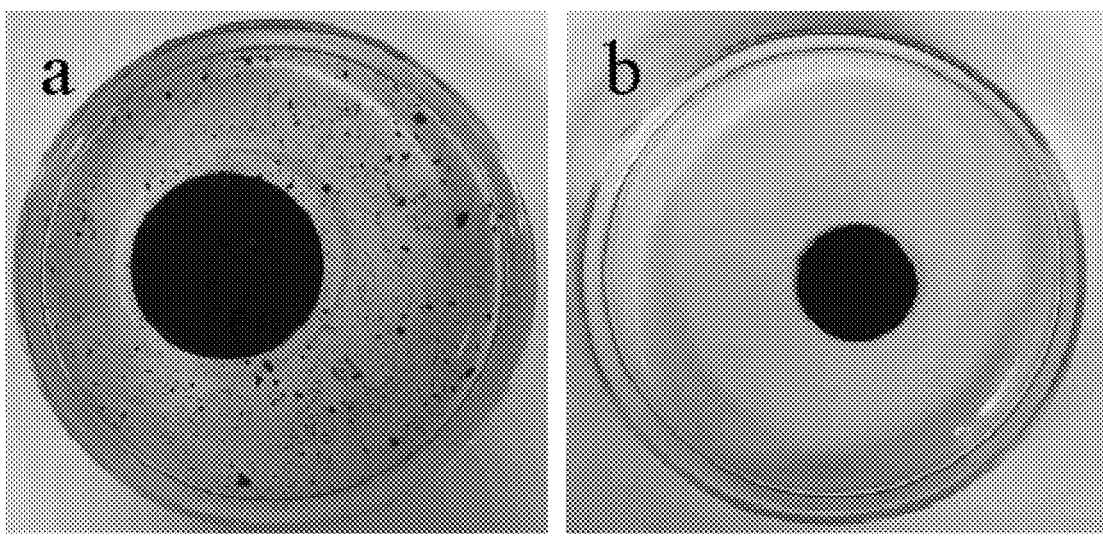
FIG. 6 is an test showing the contrast of stability comparison between pure activated carbon and ACM.

The structure stability of prepared ACM is evaluated as shown in FIG. 6. Figure a shows activated carbon cannot form a membrane without grapheme. Figure b shows membrane is formed when adding a mass ratio of 1% graphene. Pure activated carbon is unstable which is easy to be disassembled in water. After adding mass ratio of 1% graphene, the membrane can be stably formed independently of the substrate to form an activated carbon-based all-carbon membrane (ACM). ACM has strong structural stability in water and can exist stably.

Figure 7:
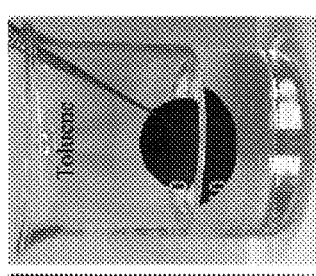
FIG. 7 is an experiment showing the stability of ACM in strong acid, strong alkali solution and various other corrosive solvents.
Figure 7:
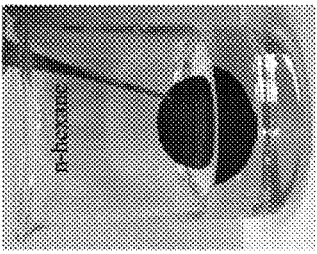
Figure 7:
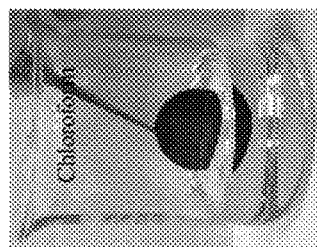
Figure 7:
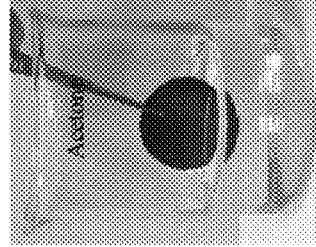
Figure 7:
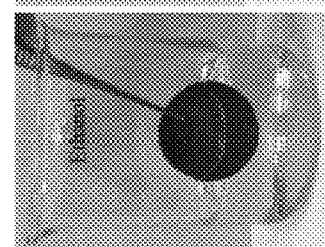
Figure 7:
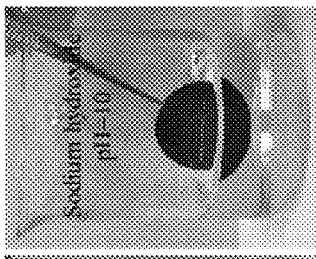
Figure 7:
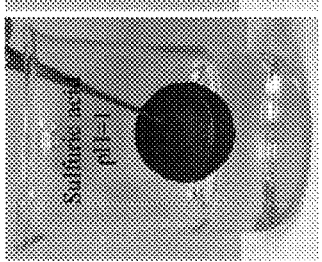

In order to evaluate the chemical stability of ACM, we chose acidic solution (HCl, pH=1), alkaline solution (NaOH, pH=10) and different organic solvents, including ethanol, acetone, chloroform, n-hexane, toluene. ACM_20-3 was chosen as a representative to be evaluated. As shown in FIG. 7, ACM has good chemical stability, and can maintain its original structural stability after soaking for more than 24 hours in different solution or solvents, including pure water. Results indicate that the π-π interactions between graphene and AC result in strong chemical stability of ACM and let it can stably exist in acid, alkali or corrosive solvents. This is not possible for a general polymer organic membrane or a polymer-linked activated carbon membrane.

Figure 8:
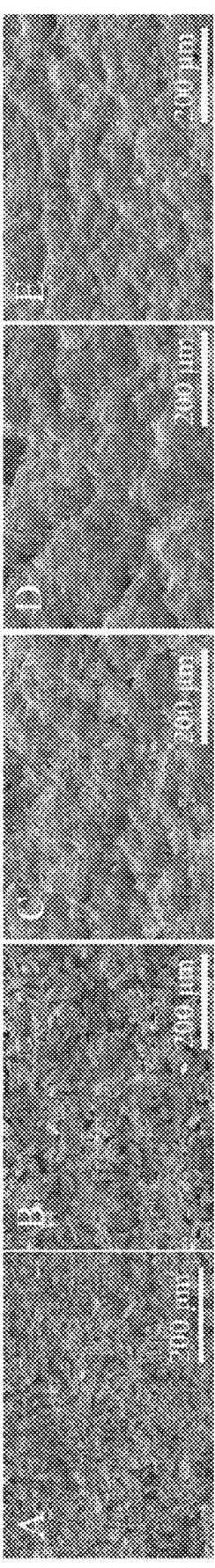
FIG. 8 is the surface structure variation of ACM under 200 times magnification.

In order to further investigate the regulation of the surface structure of ACM with the addition ratio of graphene, we observe the surface structure of ACM by SEM. FIG. 8A-E represent the surface structure of ACMs with 0%, 1%, 3%, 5% and 7% graphene ratio. As shown in FIG. 8A, in the absence of graphene, the AC particles are not connected to each other, showing a relatively independent state. Once graphene ratio reaches 1%, AC particles cross-link to form a membrane structure and its surface has a large pore structure. Comparing FIG. 8B and FIG. 8C, when graphene ratio increases from 1% to 3%, the surface structure of ACM becomes denser and its surface pore size becomes smaller. When graphene ratio reaches 5% FIG. 8D, the surface porosity is further reduced, and the pore size is decreased. When graphene ratio reaches 7% FIG. 8E, almost no pore structure can be found under SEM observation, which

Figure 9:
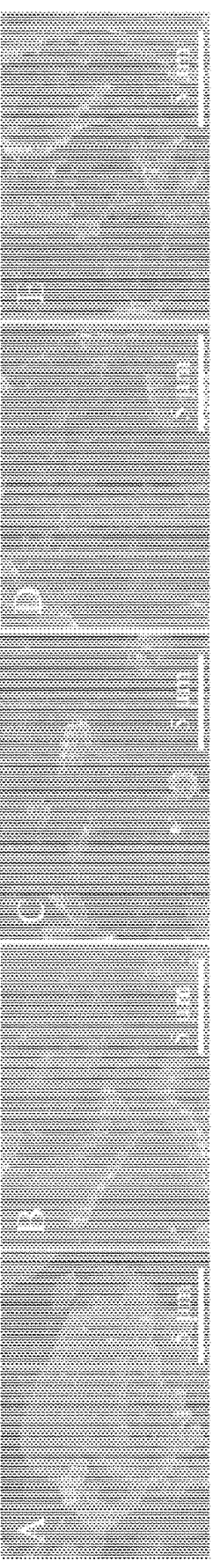
FIG. 9 is the surface structure of membranes under 15,000 times magnification.

11 indicates the pore size is in nano-scale. As shown in FIG. 9, at a higher magnification, as the surface structure of the activated carbon changes more significantly and the amount of graphene added increases, the planar structure of the graphene on the surface of ACM becomes more and more obvious.

Figure 10:
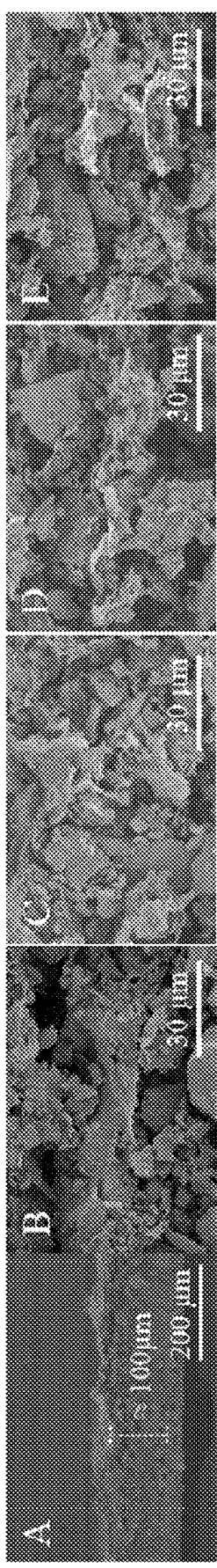
FIG. 10 is the cross-section structure of ACM.

Revealed by the cross-section image (FIG. 10), the thickness of ACM is about 100 μm. And its thickness can be adjusted by the amount of activated carbon added. It can be found from the observation under high magnification that with the increase of the amount of graphene added, the interlayer structure of ACM is basically unchanged, showing a structure in which graphene and activated carbon are uniformly crosslinked.

Figure 11:
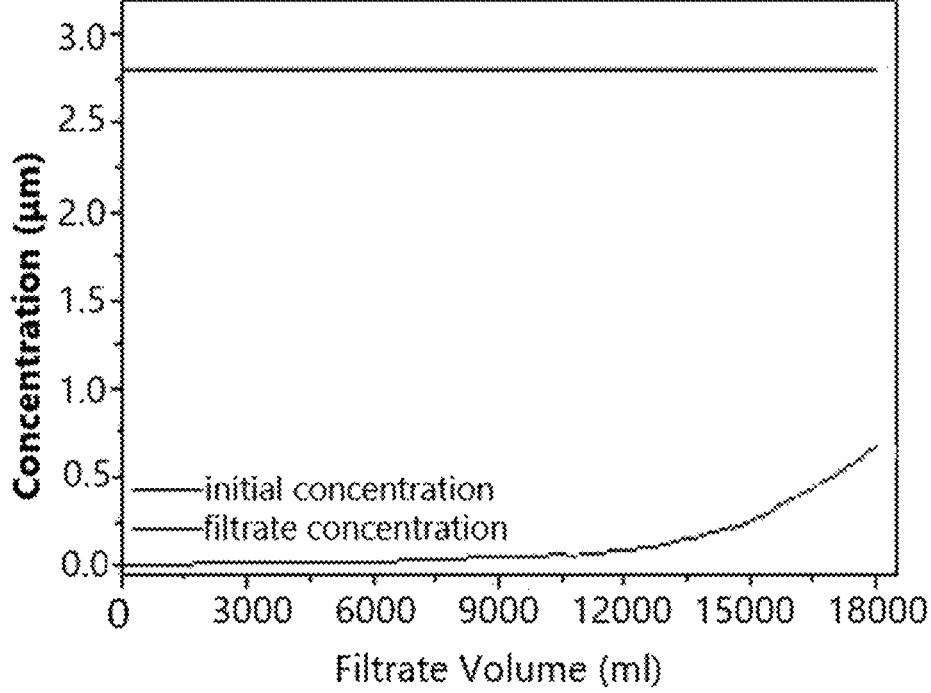
FIG. 11 is the adsorption breakthrough curve of ACM adsorbing phenanthrene

To further evaluate the adsorption capacity of ACM, phenanthrene (PHE) was selected as a representative aromatic pollutant. The PHE concentration is controlled at 0.5 mg/L, flux was controlled at 350 L/m2/h/bar and the applied surface of ACM is about 3.47 cm2. The result is shown in FIG. 11. According to the adsorption breakthrough curve of PHE, 3.47 cm2 ACM can purify almost 10 L PHE polluted water with 99% removing efficiency. The membrane is still not saturated, even permeated through 18 L polluted water. This result indicates that ACM possess not only good intercept ability but also strong adsorption capacity to pollutant.

Embodiment 8

Figure 12:
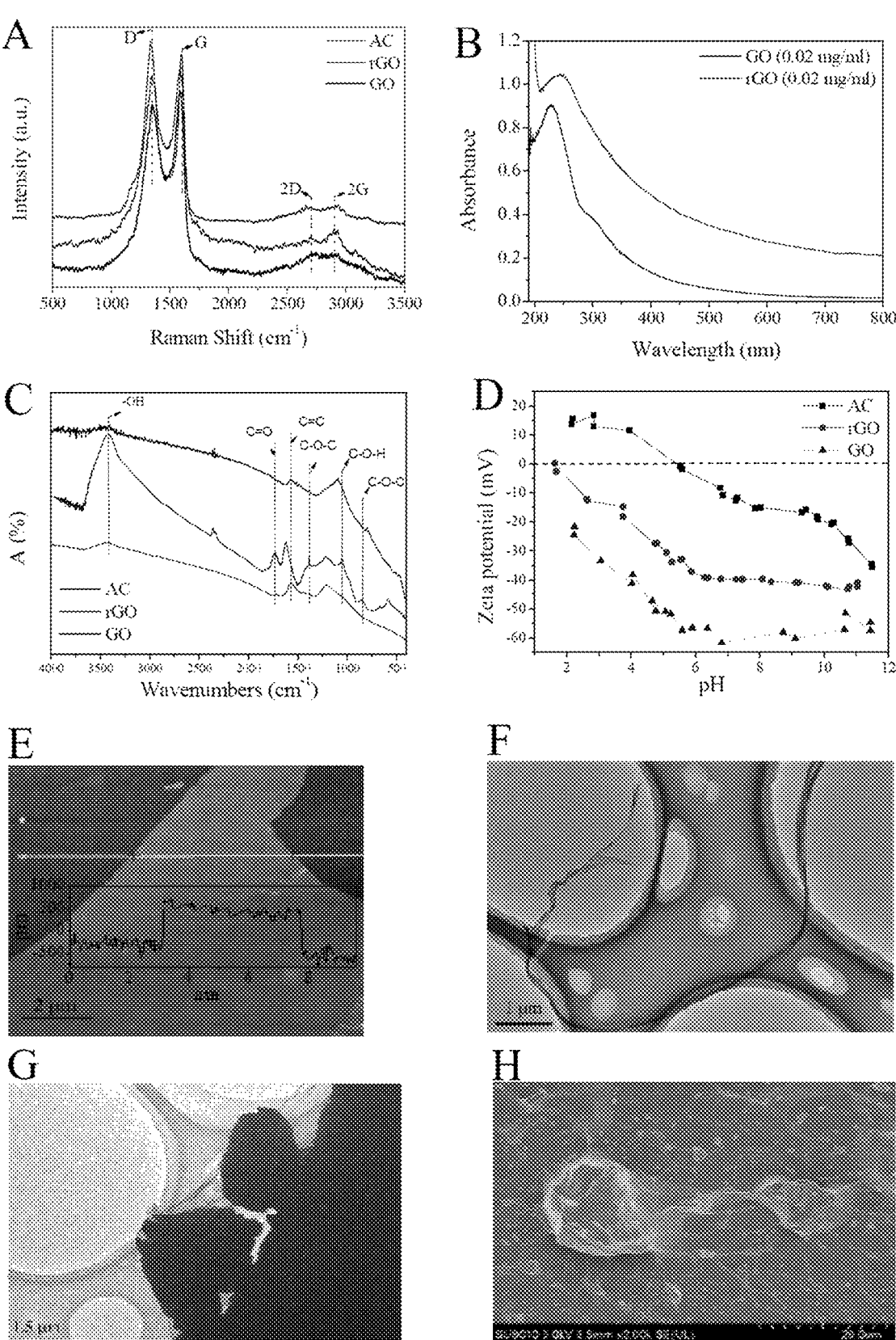
FIG. 12A is Raman spectra of activated carbon, graphene oxide and reduced graphene oxide.
FIG. 12B is Ultraviolet-visible spectra of graphene oxide dispersion and reduced graphene oxide dispersion.
FIG. 12C is infrared spectroscopy spectra of activated carbon, graphene oxide and reduced graphene oxide.
FIG. 12D is Zeta curves of activated carbon, graphene oxide and reduced graphene oxide.
FIG. 12E is AFM image of reduced graphene oxide.
FIG. 12F is TEM image of reduced graphene oxide.
FIG. 12G is TEM image of the interaction between reduced graphene oxide and activated carbon.
FIG. 12H is SEM image of the interaction between activated carbon and reduced graphene oxide.
Figure 17:
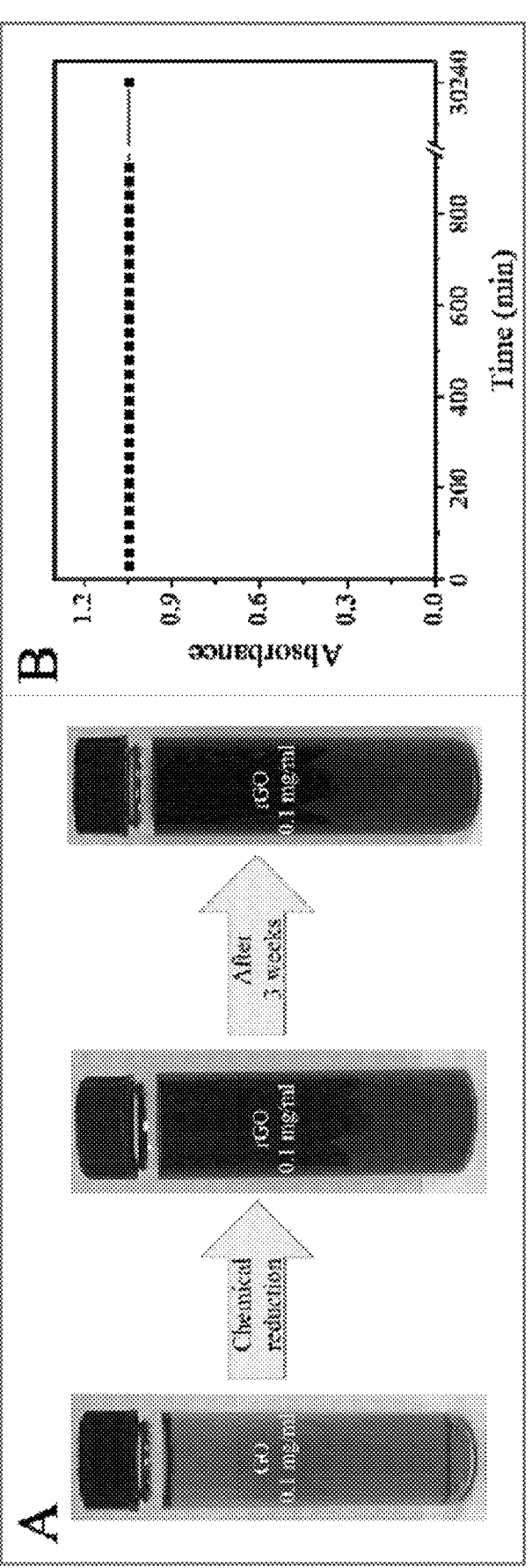
FIG. 17 B is Ultraviolet-visible spectrum of graphene oxide dispersion. (the concentration of reduced graphene oxide dispersion is 0.02 mg/ml, the detection wavelength is 240 nm)

ACM was prepared through pressured filtration assembly. The detailed process is shown in FIG. 1. After filtration and assembly, the obtained membrane can be peeled off from the substrate to obtain freestanding ACM. Detailed preparation process is as follows:

(1) Well dispersion is the precondition for uniform structure assembly. Firstly, activated carbon is dispersed in water to form activated carbon dispersion. Then add graphene dispersion into activated carbon dispersion to form mixed solution. (2) To enhance the π-π interaction between AC and graphene, under the condition of ensuring the dispersion of monolayer, the graphene oxide (GO) is first reduced by partial reduction. As shown in FIG. 12A-B after reduction, ID/IG in Ramen spectra decreased from 0.97 to 0.91 and the adsorption peak in Ultraviolet-visible spectra also redshift from 230 to 240 nm. It shows that the sp2 hybrid π-electron system is enhanced after reduction, and the surface defects are repaired. Due to the partial reduction, some of the oxygen-containing groups still exist on reduced graphene oxide (FIG. 12C). Under the mutual repulsion, reduced graphene oxide can be well dispersed in water with no precipitation, even after 3 weeks (FIG. 17). Revealed by AFM and TEM (FIG. 12E-F)), the thickness of monolayer reduced graphene oxide is about 1 nm and its width is about 10 μm. (3) pH of the dispersion is the critical factor for the well dispersion of AC and graphene. Because with the increase of pH, the functional groups on the surface of activated carbon and reduced graphene oxide will dissociate, which makes it have stronger electrostatic repulsion, thus preventing the agglomeration of the activated carbon and reducing graphene oxide. (FIG. 12D). In the process of filtration and assembly, under the action of pressure, the activated carbon and the reduced graphene oxide will be in close contact, and at the same time, the two are connected by π-π force to form a stable graphene-linked activated carbon-based all-car-

Figure 18:
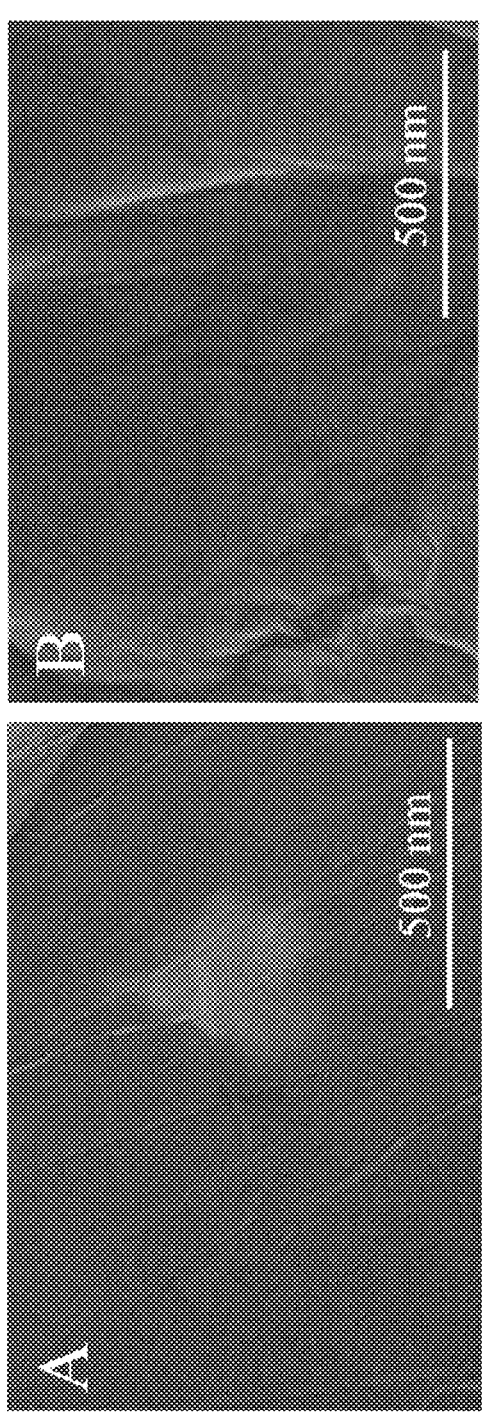
FIG. 18 are SEM images of the interacted graphene and activated carbon under high magnification.

12 bon membrane (ACM). Observed at high magnification, we can find that the reduced graphene oxide will be in close contact with the activated carbon, connected, and attached to the activated carbon surface, and the attached reduced graphene oxide will make the rough surface of AC be smooth.(FIG. 18). (4) The structure of ACM can be regulated by the ratio of AC to graphene. Once graphene ratio is equal to or higher than 1%, ACM can independently exist without supporting structure (FIG. 19B1-E1). The thickness of ACM can be regulated by the amount of AC and the surface pore structure can be controlled by reduced graphene oxide ratio. With the increase of reduced graphene oxide ratio, the color of the surface of ACM gradually changes from black to dark brown (FIG. 19B1-E1). It is worth mentioning, the preparation process can be completed in a few minutes. And using water as solvent, the whole preparation process is eco-friendly.

Figure 2:
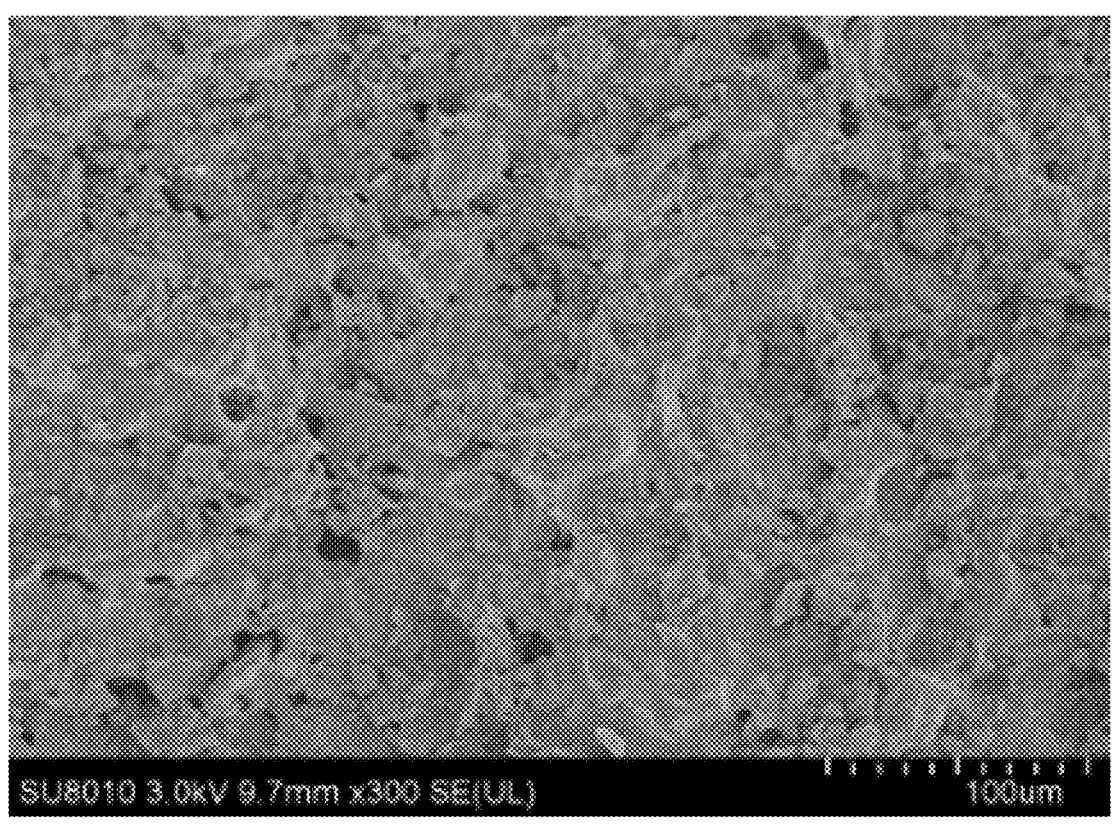
FIG. 2 is Scanning Electronic Microscope (SEM) images of ACM made according to the Embodiment 1.
Figure 3:
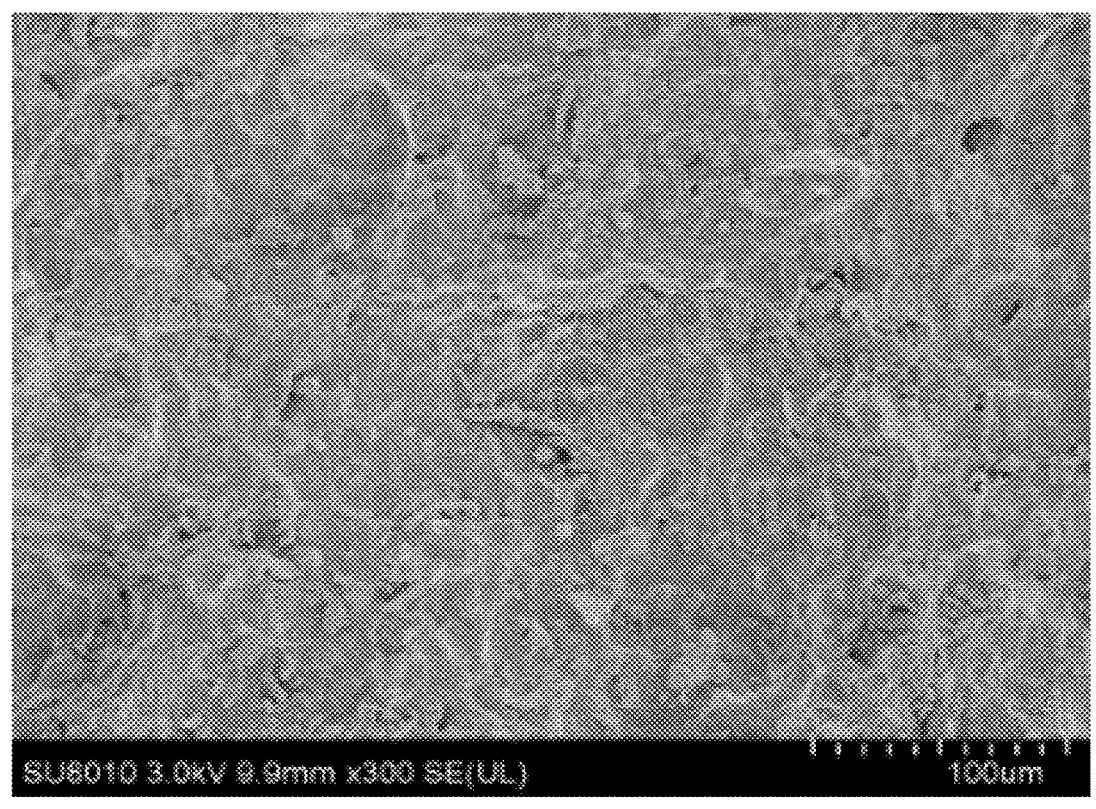
FIG. 3 is SEM images of ACM made according to the Embodiment 3.
Figure 4:
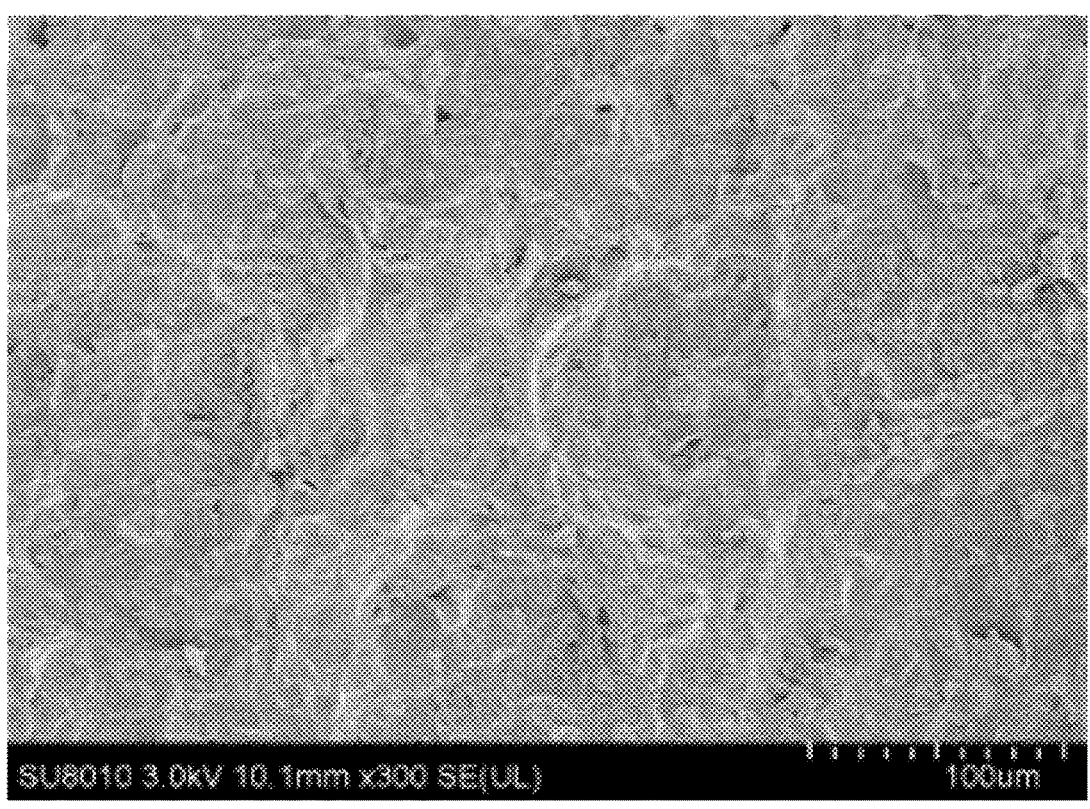
FIG. 4 is SEM images of ACM made according to the Embodiment 5.
Figure 5:
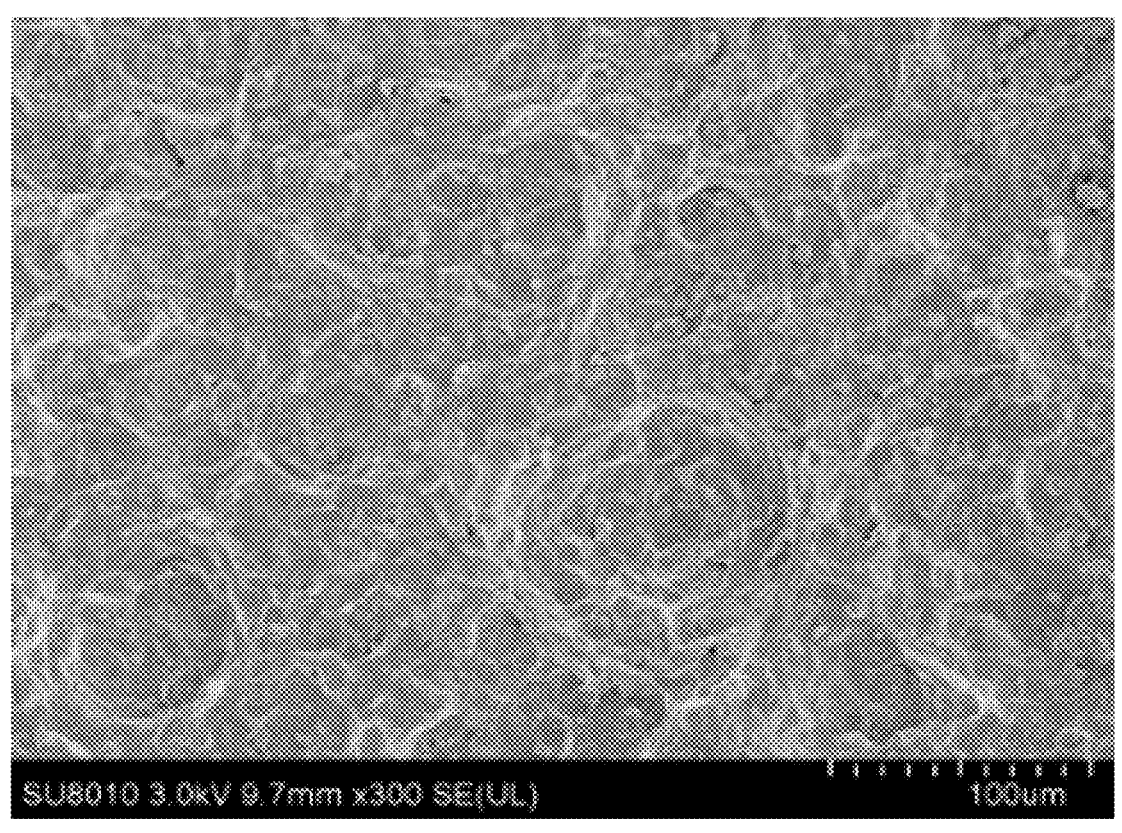
FIG. 5 is SEM images of ACM made according to the Embodiment 7.
Figure 19:
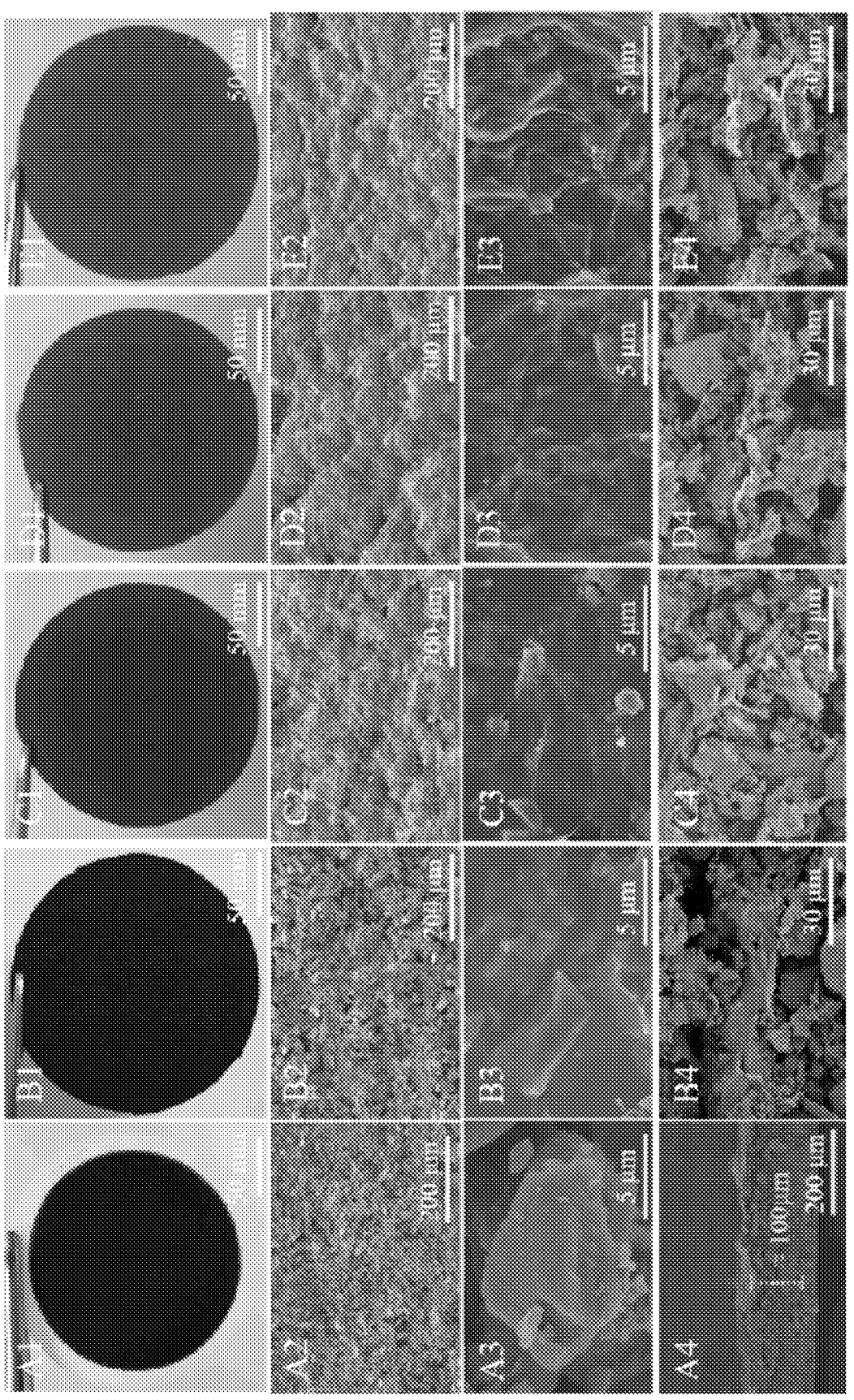
FIG. 19 D1-D3 are photo images of ACM_20-5 with reduced graphene oxide at a ratio of 5%, SEM images of surface morphology under low magnification, SEM images of surface morphology under high magnification respectively.

The surface structure and cross-section structure of ACM are shown in FIG. 18. Pure activated carbon is a loose, granular structure without the action of graphene. (FIG. 19A2). With the increase of reduced graphene oxide, the membrane surface becomes denser and smoother, and the surface pore structure becomes smaller (FIG. 19 B2-E2). Under higher magnification, we found that AC particles are isolated with no mutual interaction (FIG. 19A3). On the contrary, under the influence of reduced graphene oxide, AC particles linked together and formed a specific membrane. The connection between AC particles becomes stronger with the increase of reduced graphene oxide addition. Through surface structure observation, we can find that the surface structure of ACM can be orderly regulated by controlling the reduced graphene oxide ratio. By observing the cross-section structure of ACM, it is revealed that the cross-section structure of ACM doesn't change much with increasing of reduced graphene oxide ratio (FIG. 19B4-E3). The thickness of ACM is about 100 μm which depends on the amount of activated carbon added and can be controlled by changing the amount of activated carbon added.

Using the same method, different ACMs are prepared by controlling the ratio of AC to graphene. The results are shown in Table 2. Different ACMs are named as ACM_X-Y. X represents the amount of AC (mg) and Y represents the percentage of reduced graphene oxide rGO relative to the amount of activated carbon (%). For example, ACM_5-1 indicates the ACM containing 5 mg AC and 1% of reduced graphene oxide.

TABLE 2

AC, graphene contents and the membrane thickness of ACM

| Membranes | AC contents (mg) | Graphene contents (mg) | Thickness (μm) |
|---|---|---|---|
| ACM_5-1 | 5 | 0.05 | 25 |
| ACM_5-2 | 5 | 0.10 | 25 |
| ACM_5-3 | 5 | 0.15 | 25 |
| ACM_5-4 | 5 | 0.20 | 25 |
| ACM_5-5 | 5 | 0.25 | 25 |
| ACM_5-6 | 5 | 0.30 | 25 |
| ACM_5-7 | 5 | 0.35 | 25 |
| ACM_10-1 | 10 | 0.10 | 50 |
| ACM_20-1 | 20 | 0.20 | 100 |
| ACM_20-3 | 20 | 0.60 | 100 |
| ACM_20-5 | 20 | 1.00 | 100 |
| ACM_20-7 | 20 | 1.40 | 100 |

Figure 13:
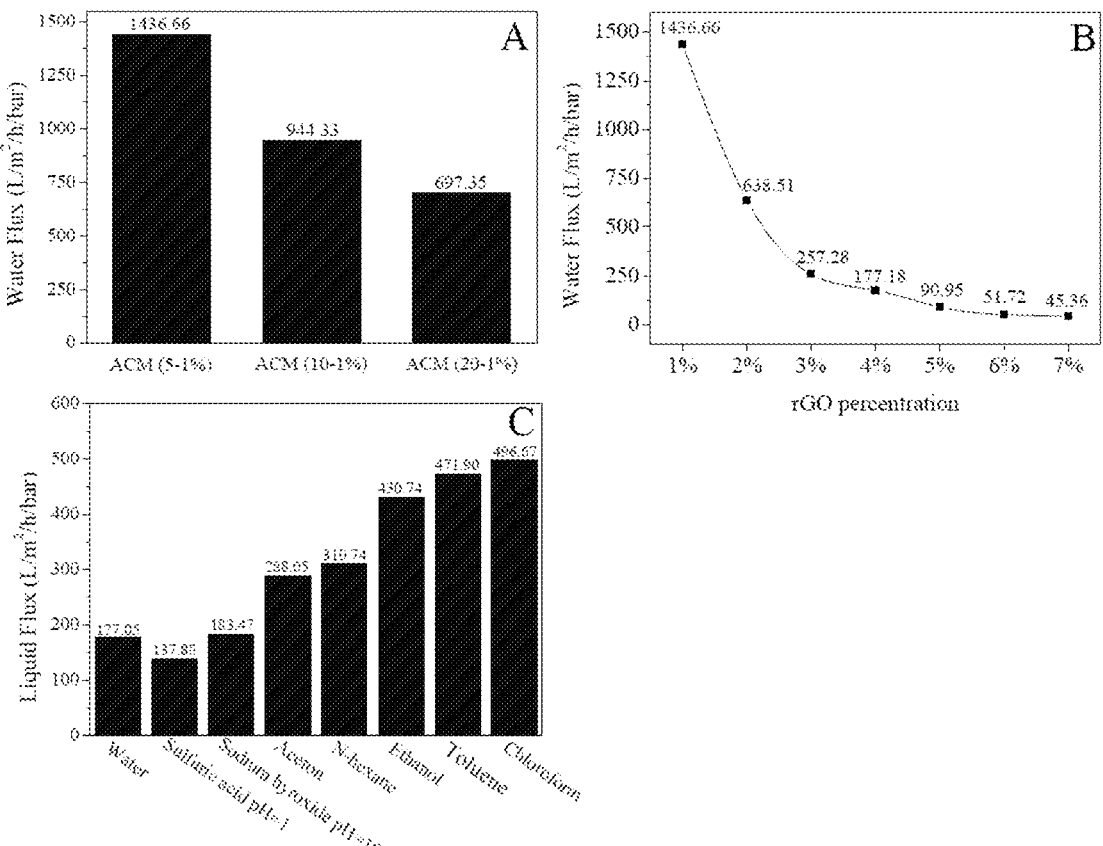
FIG. 13A is water flux variation of ACM with different thickness.
FIG. 13B is water flux of ACM with different graphene ratio.
FIG. 13C is water flux of different solvent through ACM_20-4.
Figure 14:
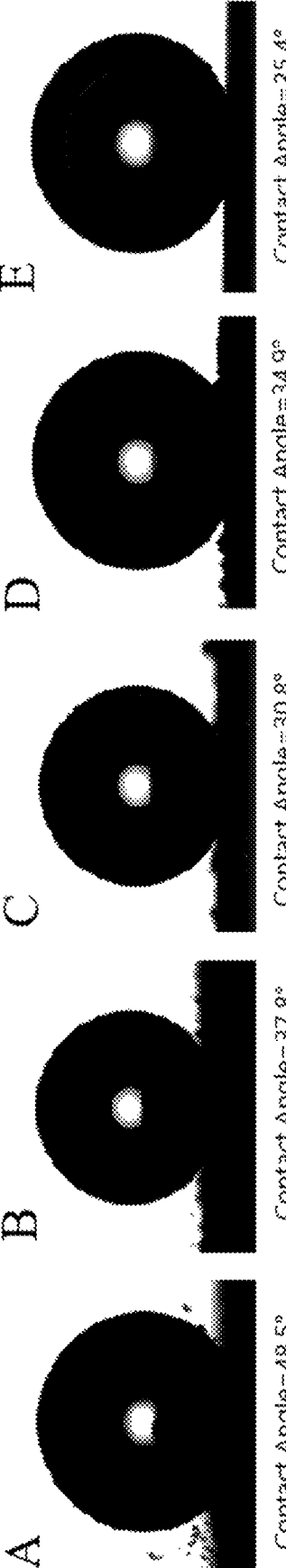
FIG. 14A-E are air contact angles under water of PACM, ACM_5-1, ACM_5-3, ACM_5-5 and ACM_5-7 respectively.

Water flux is a very important index for membrane evaluation. Water flux is closely related to the surface structure and properties of membrane, which directly determines its efficiency and energy consumption during application. Water flux will decrease with the increase of membrane thickness. Because thicker membrane indicates longer water permeate path. As shown in FIG. 13A, water flux increased with the decrease of membrane thickness and was 697.35, 944.33, 1436.66 L/m2/h/bar for ACM_20-1 ACM_10-1 and ACM_5-1, respectively. By SEM, we can find that the surface structure of ACM can be adjusted by reduced graphene oxide ratio. Through surface water contact angle measurement, we found that ACM possesses super hydrophilic surface. Rapid penetration or dispersion of water droplets when in contact with the surface of ACM. Due to the rapid penetration of water droplets, the surface contact angle of ACM cannot be accurately determined by sessile drop method. In order to accurately evaluate the surface hydrophobicity of ACM, we further employed bubble capture method. As shown in FIG. 14, the air contact angle of PACM, ACM_5-1, ACM_5-3, ACM_5-5 and ACM_5-7 were 48.5°, 37.8°, 30.8°, 34.9° and 25.4° respectively. Low air contact angle indicates that the membrane possesses super hydrophilic surface and high surface energy.

Figure 15:
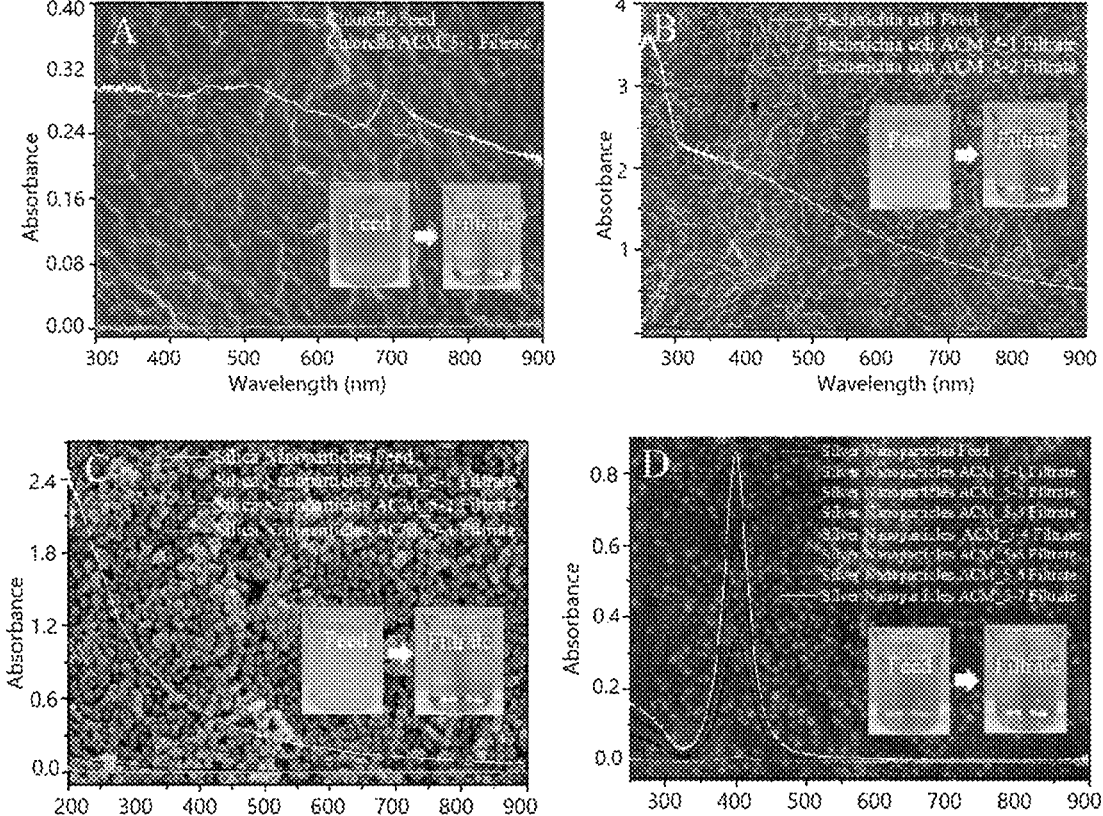
FIG. 15A-D are Ultraviolet-visible spectra of *chlorella, E. coli*, nano silica and nanosilver after filtrating through ACM respectively. The background is the SEM image of ACM surface after filtration. The inserted pictures show the appearance change of the solution before and after filtration.

To further evaluate the interception performance of ACM, we select particles of different sizes including *chlorella, E. coli*, nano silica and nano Ag. The sizes of the particles are shown in Table 3 by Zeta-sizer. As shown in FIG. 15A, ACM_5-1 can intercept *chlorella* with almost 100% intercept rate, indicating the pore size of ACM_5-1 is smaller than 1.4 μm. For *E. coli* (FIG. 15B), the intercept rate of ACM_5-1 and ACM_5-2 is 98.88% and 100% respectively. Results indicate that the pore size of ACM_5-1 is in the range of 0.3-1.2 μm. It is worth mentioning, after filtration, the filtrate is cultured again and no *E. coli* was found, indicating that ACM_5-2 can completely eliminate *E. coli* from dispersion.

TABLE 3

Size, concentration of selected particles and their referenced intercept rate of membranes to them

| | Particles | | | |
| --- | --- | --- | --- | --- |
| | Chlorella | E. coli | Nano silica | Nano Ag |
| Size (nm) | 1400-2400 | 300-1200 | 70-800 | 24-140 |
| Concentration (mg/mL) | 0.265 | 0.758 | 3.004 | 0.0108 |
| ACM_5-1 intercept rate | 100.00% | 98.88% | 59.09% | 13.30% |
| ACM_5-2 intercept rate | 100.00% | 100.00% | 95.60% | 28.60% |
| ACM_5-3 intercept rate | 100.00% | 100.00% | 100.00% | 36.93% |
| ACM_5-4 intercept rate | 100.00% | 100.00% | 100.00% | 50.88% |
| ACM_5-5 intercept rate | 100.00% | 100.00% | 100.00% | 60.44% |
| ACM_5-6 intercept rate | 100.00% | 100.00% | 100.00% | 82.14% |
| ACM_5-7 intercept rate | 100.00% | 100.00% | 100.00% | 99.23% |

Figure 16:
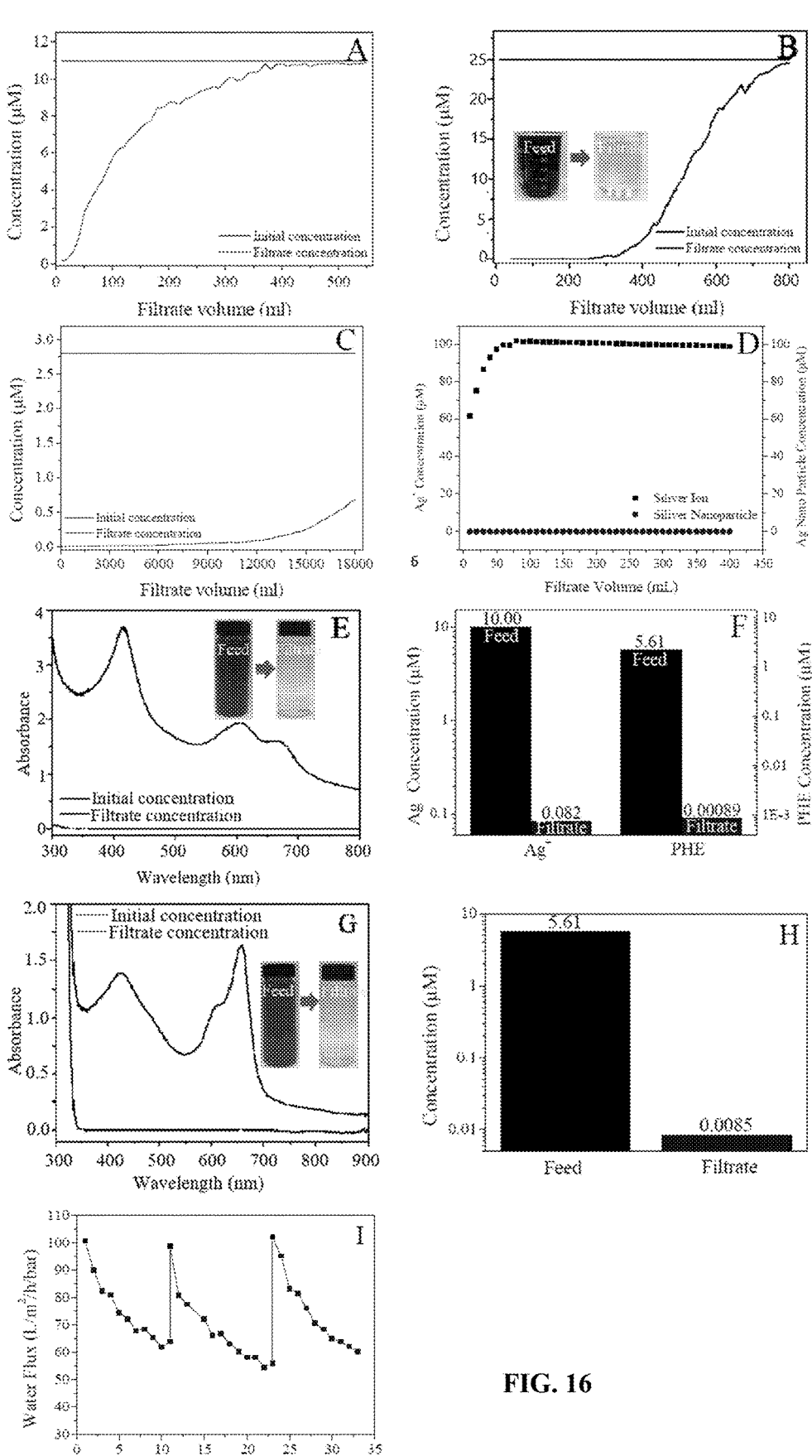
FIG. 16 B is a adsorption breakthrough curve of MB solution through ACM_20-1.

Smaller nano particles including nano silica (70-800 nm) and nanosilver (24-140 nm) were applied to evaluate the interception performance of ACM. As shown in FIG. 15C, ACM_5-2 can intercept nano silica with intercept rate of 95.60%, indicating the pore size of ACM_5-2 is 70-800 nm. When nano silica dispersion filtrates through ACM_5-3, the intercept rate can reach almost 100%, indicating the pore size of ACM_5-3 is smaller than 70 nm. As shown in FIG. 15D ACM_5-7 can intercept nanosilver with an interception rate of 99.23%, indicating the pore size of ACM_5-7 is 24-70 nm. The experimental results show that the ACM possesses controllable surface structure and can also effectively remove micro-scale and nano-scale pollutants from water. It also shows that the adjustment of reduced graphene oxide ratio can effectively regulate the surface structure of ACM. As reduced graphene oxide ratio increases, the surface structure of ACM becomes denser, and the pore structure becomes smaller. In other words, the regulation of the reduced graphene oxide ratio can precisely control the pore size of ACM for interception, and achieve the regulation of the membrane size from micron to nanometer. FIG. 15A-D are Ultraviolet-visible spectra of *chlorella, E. coli*, nano silica, and nanosilver after filtrating through ACM respectively. The background is the SEM image of ACM surface after filtration. The inserted picture is the appearance change of the solution before and after filtration To evaluate the adsorption capacity of ACM, we selected heavy metal ions (Ag+), dye (MB) and aromatic pollutant (PHE) as pollutant. As a typical heavy metal ion, Ag+ can interact with ACM through electrostatic adsorption. As s a typical dye, MB is widely applied in industry and it can interact with ACM through electrostatic interaction and π-π interaction. As a representative aromatic pollutant, PHE can interact with ACM through strong π-π interaction. As filtration rate will affect the adsorption performance, the filtration rate is controlled at 350 L/m2/h. As shown in FIG. 16A, initial concentration of Ag+ was controlled at 11 μM, after 10 mL filtration, Ag+ starts to permeate. After 400 mL filtrate, ACM was almost saturated. According to the adsorption breakthrough curve, the adsorption capacity of ACM to Ag+ was almost 7.7 mg/g. After saturation, ACM will not adsorb Ag+, and Ag+ can permeate through ACM freely. As ACM_5-7 can efficiently intercept nano Ag, after saturated with Ag+, ACM_5-7 can efficiently separate nanosilver from Ag+ (FIG. 16(D)). The migration, transformation and toxicity of nanosilver and Ag+ is very important in environmental field. ACM membrane separation technology provides a more efficient way than others.

Compared with the adsorption to heavy metal ions, ACM exhibits stronger adsorption to MB. As shown in FIG. 16B, initial concentration of MB is 25 μM and MB begins to permeate after 300 mL filtration. ACM_20-1 will be saturated after 800 mL filtration. According to the adsorption breakthrough curve, the adsorption capacity of ACM_20-1 was 235.2 mg/g. Its adsorption capacity is much higher than other adsorbents such as: carbon nanotube (46.2 mg/g), resin (121.5 mg/g), biomass (171.1 mg/g) and biochar (178.6 mg/g). As shown in FIG. 16C, as a typical aromatic molecule, PHE begins to permeate after 10000 mL filtration. And ACM_20-1 is not saturated even after 18000 mL filtration. Results indicate the maximum adsorption capacity of ACM_20-1 to PHE is higher than 410 mg/g. According to the adsorption breakthrough curve, ACM_20-1 of 3.46 cm2 can treat 300 mL 25 μM MB solution or 10000 mL 2.81 μM PHE solution with almost 100% removing efficiency. Super strong adsorption capacity indicates the great potentiality of ACM in water purification.

By comparing the adsorption capacity of ACM to Ag+, MB, and PHE, we can find that ACM has different adsorption capacities for different pollutants. As a positively charged metal ion, Ag+ combines with ACM by electrostatic interaction. On the surface of ACM, its adsorption sites such as hydroxyl groups and carboxyl groups are limited, so the adsorption capacity is not high. By comparison, the adsorption capacity of ACM for MB is much larger than that of Ag+, because MB is a type of amphiphilic molecule, which can be combined with π-π interaction by electrostatic adsorption. PHE, as a typical polycyclic aromatic hydrocarbon molecule, is slightly soluble in water. Because ACM has an aromatic surface, porous structure and hydrophobic sites, it has superior adsorption capacity to PHE.

Since ACM has a dual action mechanism of pore interception and adsorption, we suspect that it can remove multiple pollutants in water at a time through only one filtration process. We configure simulated wastewater including 0.758 mg/mL *chlorella,* 0.128 mg/mL *E. coli,* 3.004 mg/mL nano silica, 0.0108 mg/mL nanosilver particles, 10 μM Ag+ and 25 μM MB. As shown in the FIG. 16E, after a single filtration of the mixed wastewater, the original black-green wastewater becomes clear. Dected by ultraviolet-visible spectra, *chlorella, Escherichia coli,* nano-silica, nano-silver in the wastewater are removed effiently. In addition, the concentration of Ag+ decreases from 10 μM to 0.082 μM, and the concentration of PHE decreases from 5.61 μM to 0.00897 μM (FIG. 16F). The experimental results show that ACM can remove multiple pollutants in water by one-step filtration through multiple mechanisms.

As shown in FIG. 16I, to evaluate the recycling performance of ACM, *E. coli* is selected as a typical pollutant. During filtration, *E. coli* gradually accumulates on the surface of ACM and the pore of ACM is blocked, which causes decrease of water flux of ACM. When the water flow recoils, the water flux of ACM recovers almost 100%, indicating that ACM possesses great antifouling surface.

Comparative Example 1: Compared with Pure AC Membrane

Detailed Preparation Method:
(1) Activated carbon (AC) particle is first grinded and passed through 500 mesh to ensure that its size is in the micrometer range to enhance its dispersion in water.
(2) Add micron-sized activated carbon to water, adjust the pH value of the solution to 11, and fully disperse the granular activated carbon in water under the action of ultrasound to obtain an activated carbon dispersion.
(3) The fully dispersed activated carbon dispersion is assembled on the same microporous membrane substrate by pressure filtration, and the operating pressure is 0.1 Mpa.
(4) Pure AC membrane is obtained after drying.
Stability evaluation: (1) Compared with the ACM, pure AC membrane cannot be peeled from the substrate to be a freestanding membrane. (2) Due to the weak mutual interaction between AC particles, pure AC membrane is easy to disassemble in water and not suitable for practical application.

Interception performance evaluation: The interception performance of pure AC membrane to nano silica is negligible. And the pore structure of pure AC membrane can't be regulated due to its simple structure.

Comparative Example 2: Compared with Polymer Crosslinked AC Membrane

Common commercial AC membranes are almost all made using polymer as cross-linker. To exhibit the difference between our ACM and commercial polymer cross-linked AC membrane, we purchased typical nylon crosslinked AC membrane and evaluated.

Stability evaluation: (1) Since a garden variety polymer is unable to withstand high temperatures, when the temperature is increased to 300° C., the commercial polymer cross-linked membrane melts and is unstable, and ACM prepared in this disclosure is stable at a high temperature of about 500° C. (2) Since a garden variety polymer is unstable in a strong acid, strong alkali or corrosive organic solvent, when the commercial nylon crosslinked AC membrane is operated under strong acid conditions, the structure disintegrates, in contrast the ACM prepared in this disclosure is stable in strong acid, strong alkali and various organic solvents.

Adsorption capacity evaluation: Due to the addition of the polymer, the active adsorption sites on the surface of the activated carbon are occupied, and the adsorption capacity is weakened. Compared with ACM of this disclosure, the adsorption capacity of nylon cross-linked AC membrane is low, and the dyes, polycyclic aromatic hydrocarbons, heavy metal ions, etc. in the water cannot be efficiently removed.

Comparative Example 3: Compared with Pure Graphene-Based Membrane

Detailed Preparation Method:
(1) In order to enhance the interaction force between graphene, graphene oxide is first treated by partial reduction. The graphene in the graphene aqueous solution is controlled at 0.05~0.1 mg/mL, the pH is controlled at 9~12, the temperature is controlled at 85~100° C., and the hydrazine hydrate ratio is controlled at 0.001~0.5 mg/mL (preferably 0.02 mg/mL). Graphene dispersion is obtained.
(2) Pure graphene-based membrane is prepared by layer-by-layer assembly of graphene dispersion by suction filtration.
(3) After drying, when the thickness of the pure graphene-based membrane reaches 5 μm, it can exist stably independent of the substrate.
Water flux evaluation: Since the interlayer pores of the pure graphene-based membrane are nanometer-scale and difficult to adjust, the water flux of pure graphene-based membrane is very low (<5 L/m2/h/bar). However, ACM prepared in this disclosure has controlled pore structure with a water flux ranging from 45.36 to 1436.66 L/m2/h/bar and a water flux 9 to 280 times that of the pure graphene-based membrane. Higher water flux means higher water treatment efficiency Cost comparison: Since the production cost of graphene is high, the market cost and the selling price are about 1000 times that of activated carbon, ACM prepared in this disclosure has a graphene membrane nanofiltration structure due to the addition ratio of graphene of only 1% to 7%. By comparison, ACM is much cheaper.

Comparative Example 4: Compared with Pure Carbon Nanotube Membrane

To compare the performance between pure carbon nanotube membrane and ACM, commercial carbon nanotube membrane is purchased and evaluated.

Adsorption capacity evaluation: Due to the porous structure of AC particles, ACM exhibits super strong adsorption capacity to pollutants which is about 2 times that of common carbon nanotube membrane.

Cost comparison: Due to the complex process of carbon nanotube preparation, carbon nanotube membrane is expensive. On the contrary, AC is a commercial adsorbent which is cost efficient. By comparison, the cost of ACM is roughly 20% of the commercial carbon nanotube membrane.

In conclusion, compared with the general carbon membrane, ACM prepared in this disclosure has the characteristics of super strong adsorption performance, super high-water flux, super chemical stability and low cost, and has strong application potential in the field of membrane separation and environmental pollution treatment.

The embodiments described above are only a preferred embodiment of the present disclosure, and are not intended to limit the present disclosure. For example, although in the above embodiments, the activated carbon is obtained by grinding through a 500 mesh screen, it does not mean that it must pass through a 500 mesh screen. As long as the activated carbon particles can be maintained at the micron level or even the nanometer level, the effect of the present disclosure is achieved. For example, the above embodiment only lists the cases where the mass ratio of graphene to activated carbon in the mixed solution is 1% to 7%, but after the test, the adjustment is performed before and after the range, for example, the mass ratio is 9%, 10%. Even if it is 10% or more, it can achieve the technical effect of the present disclosure, but the properties such as water flux may slightly decrease.

It is apparent to those skilled in the art that various changes and modifications can be made without departing from the spirit and scope of the disclosure. Therefore, any technical solution obtained by means of equivalent replacement or equivalent transformation is within the scope of the present disclosure.

What is claimed is:

1. An activated carbon-based all-carbon membrane (ACM) for water purification for *Chlorella E. coli*, nano silica, and nanosilver, comprising:

a plurality of activated carbon particle as basic material, and a graphene as crosslinking agent;

the graphene is reduced graphene oxide that forms a plurality of discrete graphene oxide sheets to separately link one of the activated carbon particles to another of the activated carbon particles; wherein the mass ratio of the graphene to the activated carbon is 7%;

the thickness of the ACM is capable of being regulated by an addition amount of the activated carbon;

a pore structure of the ACK has a water flux of 45.36 L/m²/h/bar;

an air contact angle of the ACM is 25.4°; and a surface pore size of the ACM is 24 nm-70 nm.

2. The activated carbon-based all-carbon membrane of claim 1, wherein the activated carbon is granular and forms the all-carbon membrane without supporting structure, through π-π interaction force between the activated carbon and the graphene.

3. The activated carbon-based all-carbon membrane of claim 1, wherein the thickness of the membrane can be regulated by the addition amount of activated carbon, and the more the activated carbon is added, the thicker the membrane becomes and the larger adsorption capacity the membrane has.

4. The activated carbon-based all-carbon membrane of claim 1, wherein the size of the activated carbon particles is micro-scale.

5. A method for preparing the activated carbon-based all-carbon membrane (ACM) for water purification of *Chlorella E. coli*, nano silica, and nanosilver according to claim 1, comprising the following steps:

dispersing activated carbon in water to form an activated carbon dispersion;

adding a graphene dispersion into the activated carbon dispersion to form a mixed solution, the graphene dispersion being a reduced graphene oxide dispersion having a plurality of discrete graphene oxide sheets; wherein ID and IG of Raman spectra for the graphene dispersion is equal to or smaller than 0.91; the concentration of graphene in the graphene dispersion is in the range of 0.05-1 mg/mL; the pH of the graphene dispersion is 11;

providing the mixed solution in a pressure filter, with nitrogen as a pressurized gas, a pressure range of 0.05-0.6 Mpa; and filtrating the mixed solution wherein graphene from the graphene dispersion and the activated carbon from the activated carbon dispersion are assembled on a membrane filter substrate to form the activated carbon-based all-carbon membrane; wherein the mass ratio of the graphene to the activated carbon is 6%-10%.

6. The method of claim 5, wherein the activated carbon is micro-scale.

7. The method of claim 5, wherein during the activated carbon dispersion process, the pH is adjusted to alkaline.

8. The method of claim 5, wherein the graphene dispersion is obtained by a partial reduction of a graphene oxide dispersion.

9. The method of claim 5, wherein the mixed solution is placed in a pressure filter, and the ACM is formed on the membrane filter substrate by pressure filtration.

10. The method of claim 5, wherein the activated carbon is granular and fully dispersed in the water under the action of ultrasound to obtain the activated carbon dispersion.

11. The method of claim 5, wherein the filtration is finished within 30 minutes.

12. A water purification device comprises the activated carbon-based all-carbon membrane according to claim 1.

13. The activated carbon-based all-carbon membrane (ACM) of claim 1, wherein the water purification includes removal of pollutants in water by one-step filtration; the pollutants includes *chlorella, E. coli*, nano silica, nanosilver particles, heavy metal ions (Ag+), dye (MB), and aromatic pollutant (PHE).

14. The method according to claim 5, wherein a pore diameter of the membrane filter substrate of 0.22.

* * * * *